United States Patent
Molony et al.

(10) Patent No.: US 10,822,959 B2
(45) Date of Patent: Nov. 3, 2020

(54) BLADE TIP COOLING

(71) Applicant: UNITED TECHNOLOGIES CORPORATION, Farmington, CT (US)

(72) Inventors: Evan P. Molony, Farmington, CT (US); Carey Clum, East Hartford, CT (US); Dominic J. Mongillo, West Hartford, CT (US); Charles Thistle, Middletown, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 505 days.

(21) Appl. No.: 15/623,787

(22) Filed: Jun. 15, 2017

(65) Prior Publication Data
US 2018/0363469 A1 Dec. 20, 2018

(51) Int. Cl.
| | |
|---|---|
| *F01D 5/18* | (2006.01) |
| *B22C 9/24* | (2006.01) |
| *F01D 5/20* | (2006.01) |
| *B22C 13/08* | (2006.01) |
| *B22C 9/10* | (2006.01) |
| *B22D 29/00* | (2006.01) |

(Continued)

(52) U.S. Cl.
CPC ............ *F01D 5/187* (2013.01); *B22C 9/10* (2013.01); *B22C 9/24* (2013.01); *B22C 13/085* (2013.01); *B22D 29/001* (2013.01); *F01D 5/186* (2013.01); *F01D 5/20* (2013.01); *F04D 29/388* (2013.01); *F04D 29/582* (2013.01); *F05D 2220/32* (2013.01); *F05D 2230/21* (2013.01); *F05D 2260/20* (2013.01); *F05D 2260/202* (2013.01)

(58) Field of Classification Search
CPC . F01D 5/187; F01D 5/186; F01D 5/20; B22C 9/10; B22C 13/085; B22C 9/24; B22D 29/001; F04D 29/388; F04D 29/582; F05D 2260/20; F05D 2230/21; F05D 2220/32; F05D 2260/202
See application file for complete search history.

(56) References Cited

U.S. PATENT DOCUMENTS

| | | | |
|---|---|---|---|
| 6,036,441 A | 3/2000 | Manning et al. | |
| 6,652,235 B1 * | 11/2003 | Keith | F01D 5/141 416/92 |
| 9,422,817 B2 | 8/2016 | Beattie et al. | |

(Continued)

FOREIGN PATENT DOCUMENTS

| | | |
|---|---|---|
| EP | 1441107 | 7/2004 |
| EP | 1935532 | 6/2008 |

(Continued)

OTHER PUBLICATIONS

European Patent Office, European Search Report dated Jun. 1, 2018 in Application No. 18166988.8-1006.

*Primary Examiner* — Joseph J Dallo
*Assistant Examiner* — Kurt Philip Liethen
(74) *Attorney, Agent, or Firm* — Snell & Wilmer L.L.P.

(57) ABSTRACT

A casting core may include a core body and a tip comb extending from a tip region of the core body. The tip comb may be integrally formed with the core body. The tip comb may comprise a first casting pedestal and a second casting pedestal. The first casting pedestal and the second casting pedestal may define an aperture having a tapered geometry.

2 Claims, 6 Drawing Sheets

(51) Int. Cl.
*F04D 29/38* (2006.01)
*F04D 29/58* (2006.01)

(56) References Cited

U.S. PATENT DOCUMENTS

| | | | |
|---|---|---|---|
| 9,429,027 B2 | 8/2016 | Mongillo, Jr. et al. | |
| 2003/0059304 A1* | 3/2003 | Leeke | F01D 5/20 |
| | | | 416/97 R |
| 2004/0022633 A1 | 2/2004 | Kraft | |
| 2007/0128033 A1* | 6/2007 | Lee | F01D 5/20 |
| | | | 416/97 R |
| 2008/0131278 A1* | 6/2008 | Correia | F01D 5/187 |
| | | | 416/23 |
| 2008/0131285 A1 | 6/2008 | Albert et al. | |
| 2011/0176929 A1* | 7/2011 | Ammann | F01D 5/187 |
| | | | 416/97 R |
| 2014/0271226 A1* | 9/2014 | Giglio | F01D 5/20 |
| | | | 416/97 R |
| 2016/0230564 A1 | 8/2016 | Mongillo, Jr. | |

FOREIGN PATENT DOCUMENTS

| | | | | |
|---|---|---|---|---|
| EP | 1935532 A1 * | 6/2008 | | F01D 5/187 |
| EP | 1952911 | 8/2008 | | |

\* cited by examiner

BLADE TIP COOLING

GOVERNMENT LICENSE RIGHTS

This disclosure was made with government support under Contract No. DTFAWA-15-A-80010 awarded by the Federal Aviation Administration (FAA). The government has certain rights in the disclosure.

FIELD

The present disclosure relates to cooling systems for gas turbine engines, and more specifically, to an airfoil having cooling features.

BACKGROUND

A gas turbine engine typically includes a fan section, a compressor section, a combustor section, and a turbine section. A fan section may drive air along a bypass flow path while a compressor section may drive air along a core flow path. In general, during operation, air is pressurized in the compressor section and is mixed with fuel and burned in the combustor section to generate hot combustion gases. The hot combustion gases flow through the turbine section, which extracts energy from the hot combustion gases to power the compressor section and other gas turbine engine loads. The compressor section typically includes low pressure and high pressure compressors, and the turbine section includes low pressure and high pressure turbines. The turbine section includes multiple stages of blades and vanes. As fluid flows through the turbine section, the flow causes the blades to rotate about an axis of rotation. The vanes, positioned between each row of blades, are used to redirect the flow in order to maximize the power received by the downstream blades.

Temperatures within the turbine section may be relatively high, as the flow of fluid is received initially from the combustor section of the gas turbine engine. Cooling air may be extracted from the compressor section and used to cool the gas path components. Cooled components may include, for example, rotating blades and stator vanes in the turbine section.

SUMMARY

A casting core for manufacturing an airfoil is provided. A casting core may include a core body and a tip comb extending from a tip region of the core body. The tip comb may be integrally formed with the core body. The tip comb may comprise a first casting pedestal and a second casting pedestal. The first casting pedestal and the second casting pedestal may define an aperture having a tapered geometry.

In various embodiments, the first casting pedestal may have a first width at a proximal end and a second width at a distal end. The second width of the first casting pedestal may be greater than the first width. The aperture may have a first width at a proximal end and a second width at a distal end. The second width of the aperture may be less than the first width. The core body and the tip comb may comprise a first material. The first material may comprise a ceramic. The casting core may further comprise a leading edge and a trailing edge. The tip region may extend between the leading edge and the trailing edge. The tip comb may extend from a trailing edge portion of the tip region of the core body. The tip region may be disposed at a radially outer edge of the core body.

An airfoil is also provided. The airfoil may comprise an airfoil body defining an airflow path. A tip shelf may be defined in a tip region. A first pedestal and a second pedestal may be disposed in the airflow path at the tip region. The first pedestal and the second pedestal may define a cooling passage having a proximal end and a distal end. The proximal end of the cooling passage may have a first width, and the distal end of the cooling passage may have a second width. The first width may be greater than the second width.

In various embodiments, the tip shelf may comprise a pressure side wall portion and a radially outward wall portion. The cooling passage may comprise an outlet formed in the tip shelf. The cooling passage may be directed radially outward and toward the pressure side wall portion of the tip shelf. The first pedestal and the second pedestal may have a tapered geometry.

A method of manufacturing an airfoil is also provided. The method may comprise the step of forming a casting core comprising a tip comb integral with a core body. The casting core may comprise a first material. The method may further comprise the steps of disposing a mold around the casting core, casting a second material around at least a portion of the casting core to form the airfoil, and removing the casting core.

In various embodiments, the first material may comprise a ceramic. The second material may comprise a metal. The tip comb may extend beyond a tip region of the airfoil. The step of removing the casting core may form a cooling passage within the airfoil. The step of casting a second material may form at least one pedestal. The cooling passages are separated by the at least one pedestal. The method may further comprise the step of removing a portion of the second material from a tip region of the airfoil to form an outlet of the cooling passage. The cooling passage may comprise a tapered geometry which diverges toward the outlet of the cooling passage.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

Figure 1:
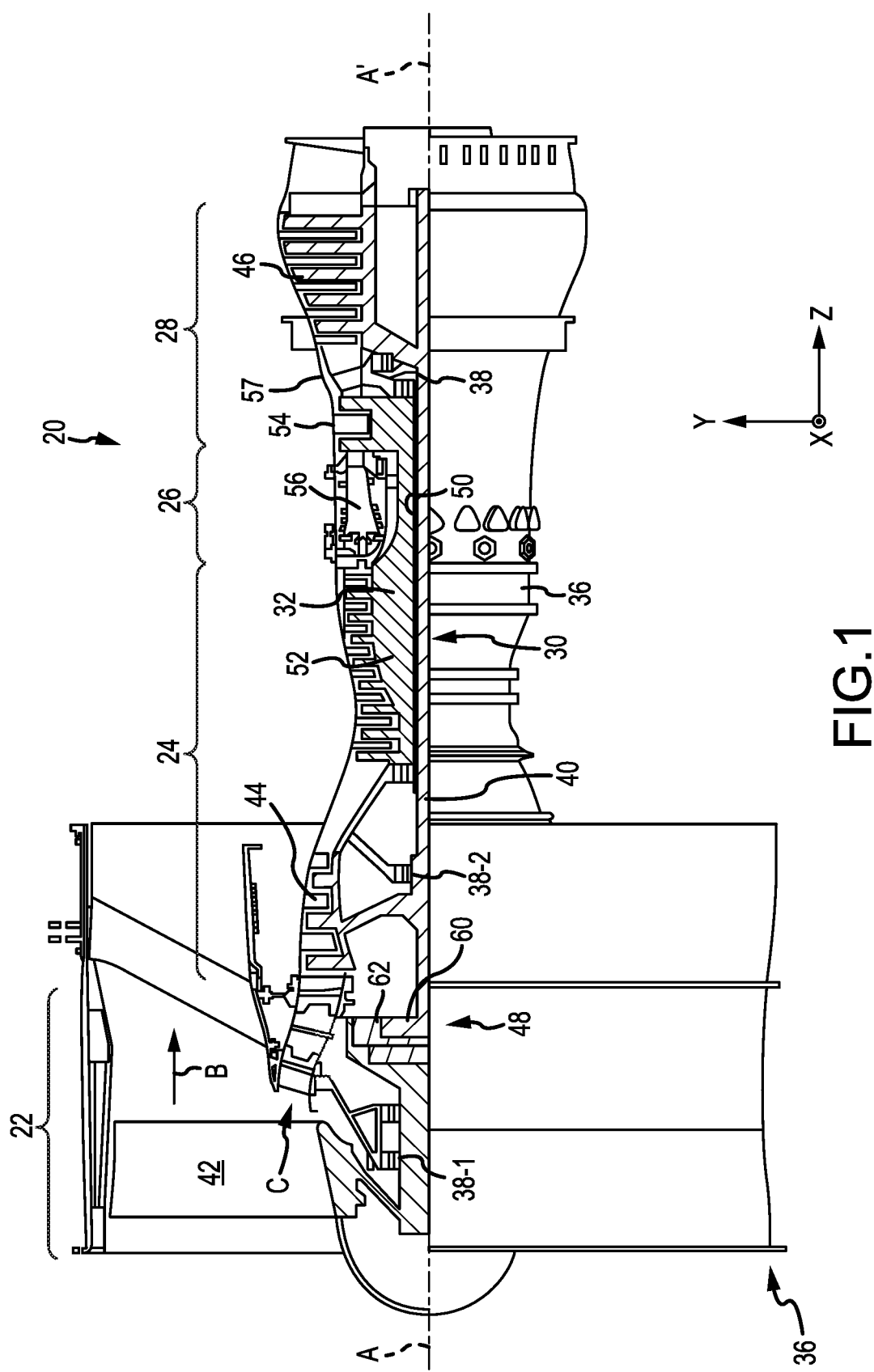
FIG. 1 illustrates a cross-sectional view of an exemplary gas turbine engine, in accordance with various embodiments.

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Any reference related to fluidic coupling to serve as a conduit for cooling airflow and the like may include permanent, removable, temporary, partial, full, and/or any other possible attachment option. Additionally, any reference to without contact (or similar phrases) may also include reduced contact or minimal contact. Cross hatching lines may be used throughout the figures to denote different parts but not necessarily to denote the same or different materials.

As used herein, "aft" refers to the direction associated with the exhaust (e.g., the back end) of a gas turbine engine. As used herein, "forward" refers to the direction associated with the intake (e.g., the front end) of a gas turbine engine.

A first component that is "radially outward" of a second component means that the first component is positioned at a greater distance away from the engine central longitudinal axis than the second component. A first component that is "radially inward" of a second component means that the first component is positioned closer to the engine central longitudinal axis than the second component. In the case of components that rotate circumferentially about the engine central longitudinal axis, a first component that is radially inward of a second component rotates through a circumferentially shorter path than the second component. The terminology "radially outward" and "radially inward" may also be used relative to references other than the engine central longitudinal axis. A first component that is "radially outward" of a second component means that the first component is positioned at a greater distance away from the engine central longitudinal axis than the second component. As used herein, "distal" refers to the direction outward, or generally, away from a reference component. As used herein, "proximal" refers to a direction inward, or generally, towards the reference component.

The next generation turbofan engines are designed for higher efficiency and use higher pressure ratios and higher temperatures in the high pressure compressor than are conventionally experienced. These higher operating temperatures and pressure ratios create operating environments that cause thermal loads that are higher than the thermal loads conventionally experienced, which may shorten the operational life of current components.

The present disclosure relates to casting cores and air foils having internal cooling cavities. Cooling features at the airfoil tip may have various shapes, sizes, and orientations. A casting core may employ a tip comb to form cooling features in a tip region of the airfoil. The casting core and tip comb may be integrally formed from a uniform material. The airfoil may be cast around the casting core, and the casting core may be subsequently removed. The airfoil internal cooling features may direct a cooling airflow through the airfoil body and out through outlets formed in a tip region of the airfoil. The cooling features may be configured to control the cooling airflow at a tip region of the airfoil.

With reference to FIG. 1, a gas turbine engine 20 is shown according to various embodiments. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive coolant (e.g., air) along a path of bypass airflow B while compressor section 24 can drive coolant along a core flow path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 or engine case via several bearing systems 38, 38-1, and 38-2. Engine central longitudinal axis A-A' is oriented in the z direction on the provided x-y-z axes. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor 44 and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54. A combustor 56 may be located between high pressure compressor 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow may be compressed by low pressure compressor 44 then high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion.

Gas turbine engine 20 may be, for example, a high-bypass ratio geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans. A gas turbine engine may comprise an industrial gas turbine (IGT) or a geared aircraft engine, such as a geared turbofan, or non-geared aircraft engine, such as a turbofan, or may comprise any gas turbine engine as desired.

Figure 2:
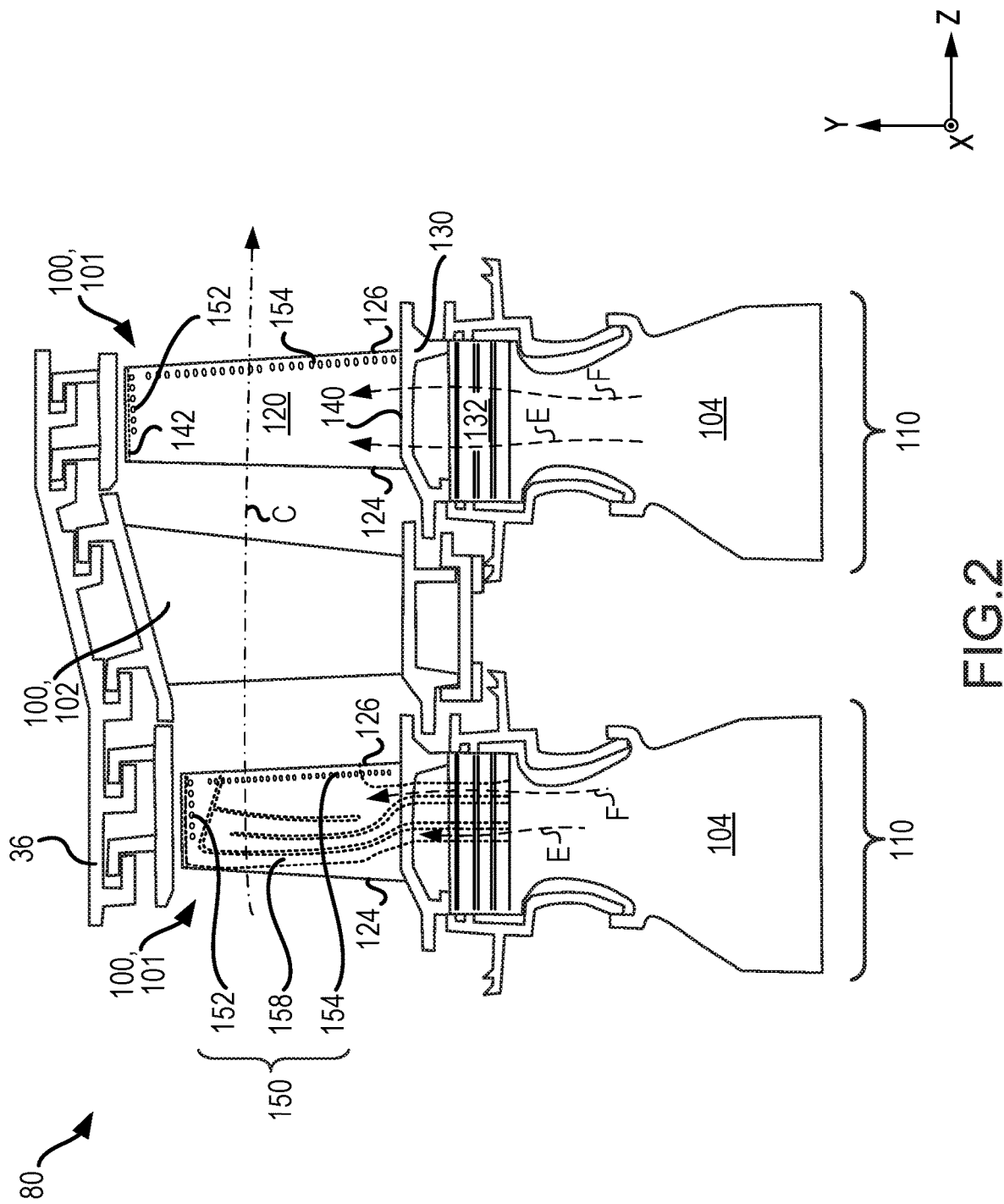
FIG. 2 illustrates a cross-sectional view of an engine section of gas turbine engine, according to various embodiments.

Referring now to FIG. 2 and still to FIG. 1, according to various embodiments, each of low pressure compressor 44, high pressure compressor 52, low pressure turbine 46, and high pressure turbine 54 in gas turbine engine 20 may comprise one or more stages or sets of rotating blades and one or more stages or sets of stationary vanes axially interspersed with the associated blade stages but non-rotating about engine central longitudinal axis A-A'. The compressor and turbine sections 24, 28 may be referred to as rotor assemblies 110. Each compressor stage and turbine stage may comprise multiple interspersed stages of blades 101 and vanes 102. Within the rotor assemblies 110 of gas turbine engine 20 are multiple rotor disks, which may include one or more cover plates or minidisks. The blades 101 rotate about engine central longitudinal axis A-A', while the vanes 102 remain stationary with respect to engine central longitudinal axis A-A'. For example, FIG. 2 schematically shows, by example, a portion of an engine section 80, which is illustrated as a turbine section 28 of gas turbine engine 20. It will be understood that the cooling systems in the present disclosure are not limited to the turbine section, and could extend to other sections of the gas turbine engine 20, including but not limited to compressor section 24.

Engine section 80 may include alternating rows of blades 101 and vanes 102 comprising airfoils that extend into the core flow path C. For example, the rotor assemblies can carry a plurality of rotating blades 101, while each vane assembly can carry a plurality of vanes 102 that extend into the core flow path C. Blades 101 create or extract energy (in the form of pressure) from the core airflow that is communicated through the gas turbine engine 20 along the core flow path C. Vanes 102 direct the core airflow to the blades 101 to either add or extract energy. Vanes 102 may be arranged circumferentially about engine central longitudinal axis A-A'. In various embodiments, a set of blades 101 may be coupled about a circumference of a generally circular disk 104, which may be disposed radially inward of core flow path C. Disk 104 with blades 101 may comprise a rotor assembly 110 configured to rotate about engine central longitudinal axis A-A'. Blades 101 and vanes 102 may generally be referred to as airfoils 100. Each airfoil 100, illustrated as blade 101, has an airfoil body 120 having a leading edge 124 facing a forward direction in the gas turbine engine and a trailing edge 126 facing an aft direction. An airfoil 100 may include a pressure side wall (i.e. having a generally concave surface) and a suction side wall (i.e. having a generally convex surface) joined together at the respective leading edge 124 and trailing edge 126. Each blade 101 may include a platform 130 and/or a root 132 disposed at an inner diameter 140 of an airfoil body 120. For example, the airfoil body 120 may extend radially outward from platform 130 and/or root 132 at inner diameter 140 to a tip region 142. Airfoil body 120, platform 130 and root 132 may be integrally formed. As used herein, the term "integrated" or "integral" may include forming one, single continuous piece. Casting may be used to form airfoils 100 of FIG. 2.

In various embodiments, an airfoil 100 may be an internally cooled component of gas turbine engine 20. An airfoil 100 may comprise a cooling system 150 having at least one internal cooling passage 158, i.e., at least one internal airflow path. In various embodiments, cooling system 150 may be configured to provide multiple airflow paths to deliver cooling airflow to an airfoil 100. With brief reference to FIG. 1, the airflow may originate from any suitable source in gas turbine engine 20. For example, the airflow may comprise air received from a compressor section of gas turbine engine 20.

In various embodiments, airfoil body 120 may define an internal cooling passage 158, which directs airflow and further defines airflow path E. Airflow path E defined by cooling passage 158 of airfoil body 120 is oriented generally in a direction radially outward from platform 130 and root 132 toward tip region 142 (i.e., a radial direction when airfoil 100 is installed in a turbine). Airfoil 100 may contain multiple cooling passages or airflow paths, such as airflow path E and airflow path F, oriented in various directions. In various embodiments, airflow path E may be directed through airfoil 100 and may exit at or near the tip region 142 of airfoil 100 through a plurality of holes or outlets 152 defined in the tip region 142 of airfoil 100. Airflow path F may be directed through airfoil 100 and may exit the trailing edge 126 of airfoil 100 through a plurality of holes or outlets 154 defined in the trailing edge 126 of airfoil 100.

Figure 3A:
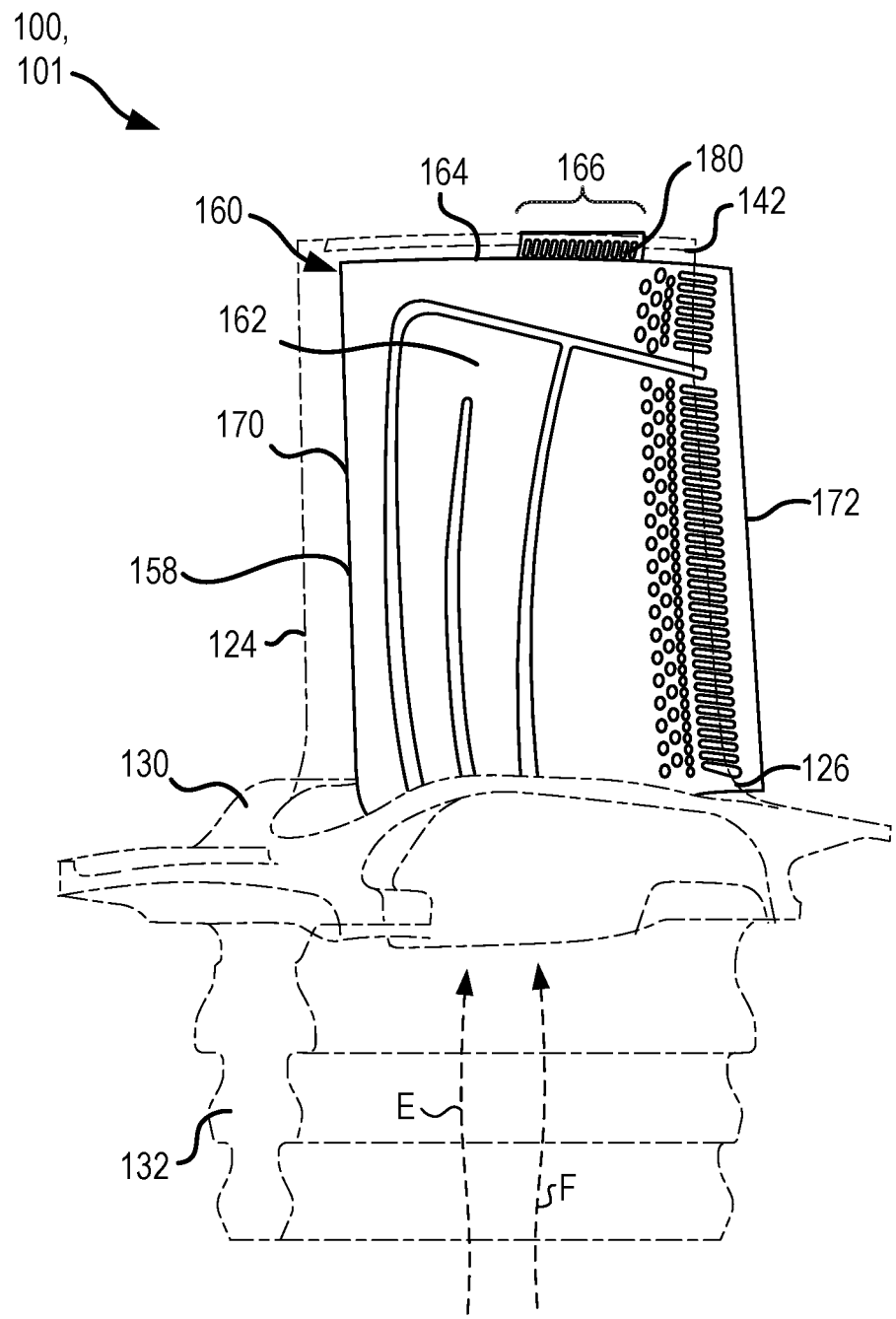
FIGS. 3A and 3B illustrate a casting core for casting an airfoil, in accordance with various embodiments.
Figure 3B:
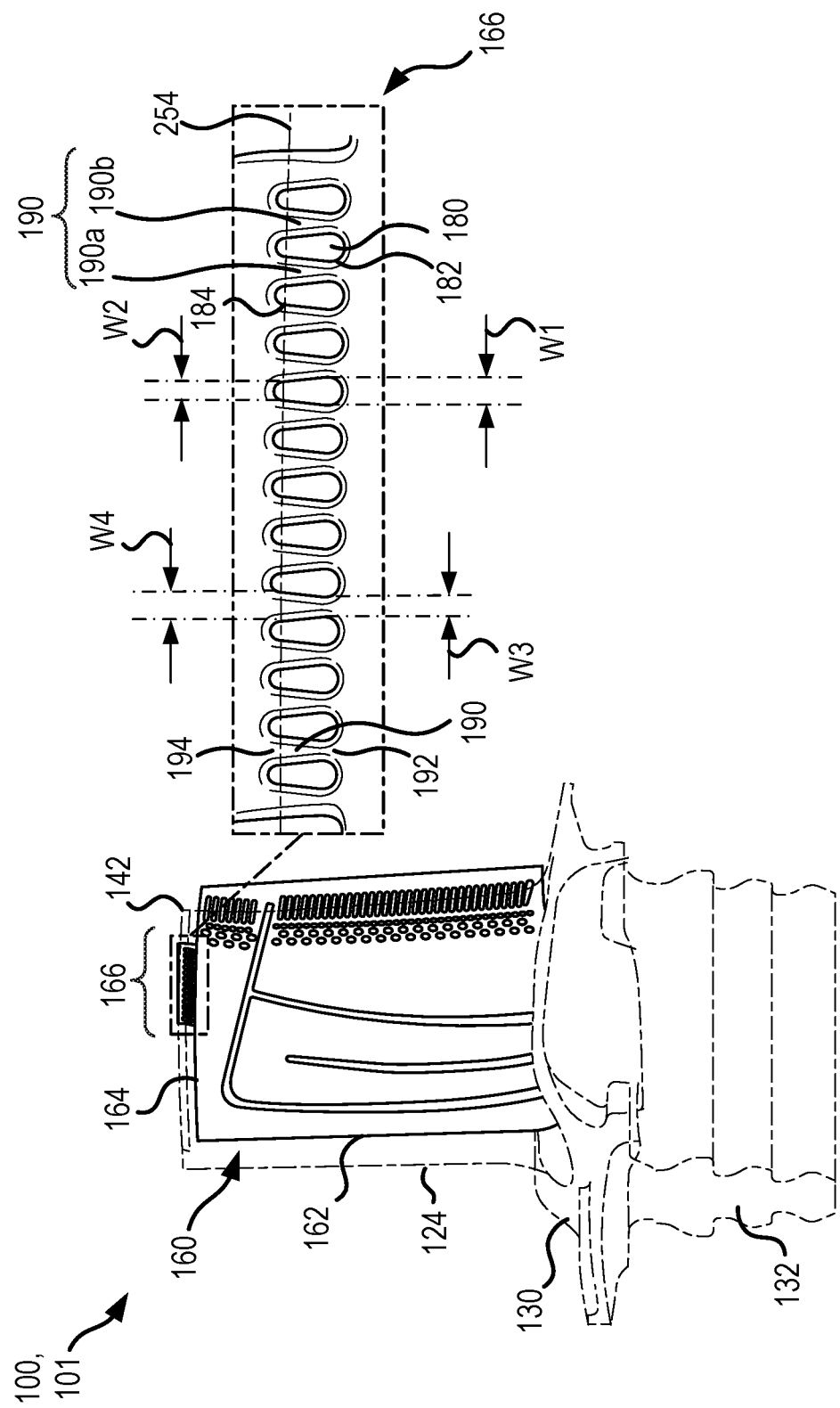

In various embodiments and with reference to FIGS. 3A and 3B and still to FIG. 2, casting may be used to form airfoils 100. Casting core 160 may be used in casting airfoil 100 to define internal features, such as cooling passage 158 as well as outlets 152 and outlets 154 of airfoil 100.

Figure 4A:
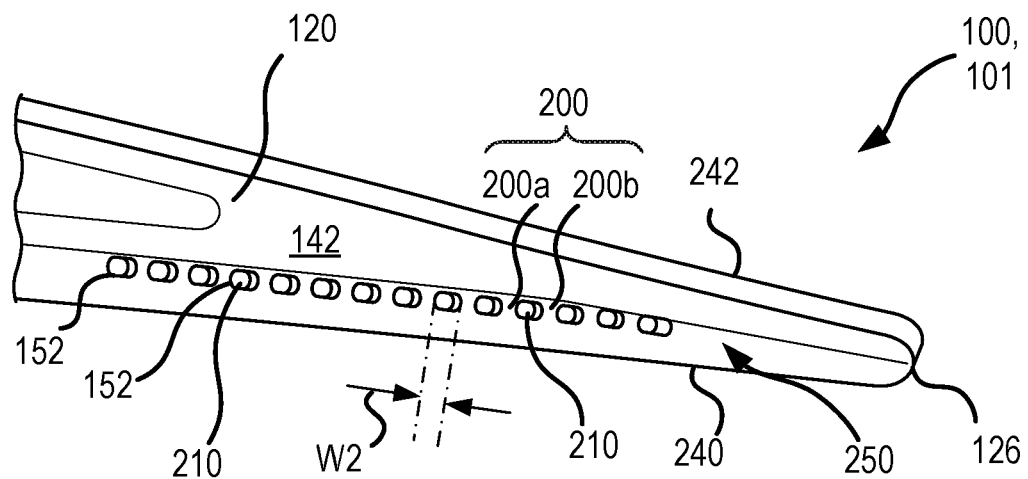
FIGS. 4A and 4B illustrate a partial top view and a partial perspective view of an airfoil having a cooling feature, in accordance with various embodiments.
Figure 4B:
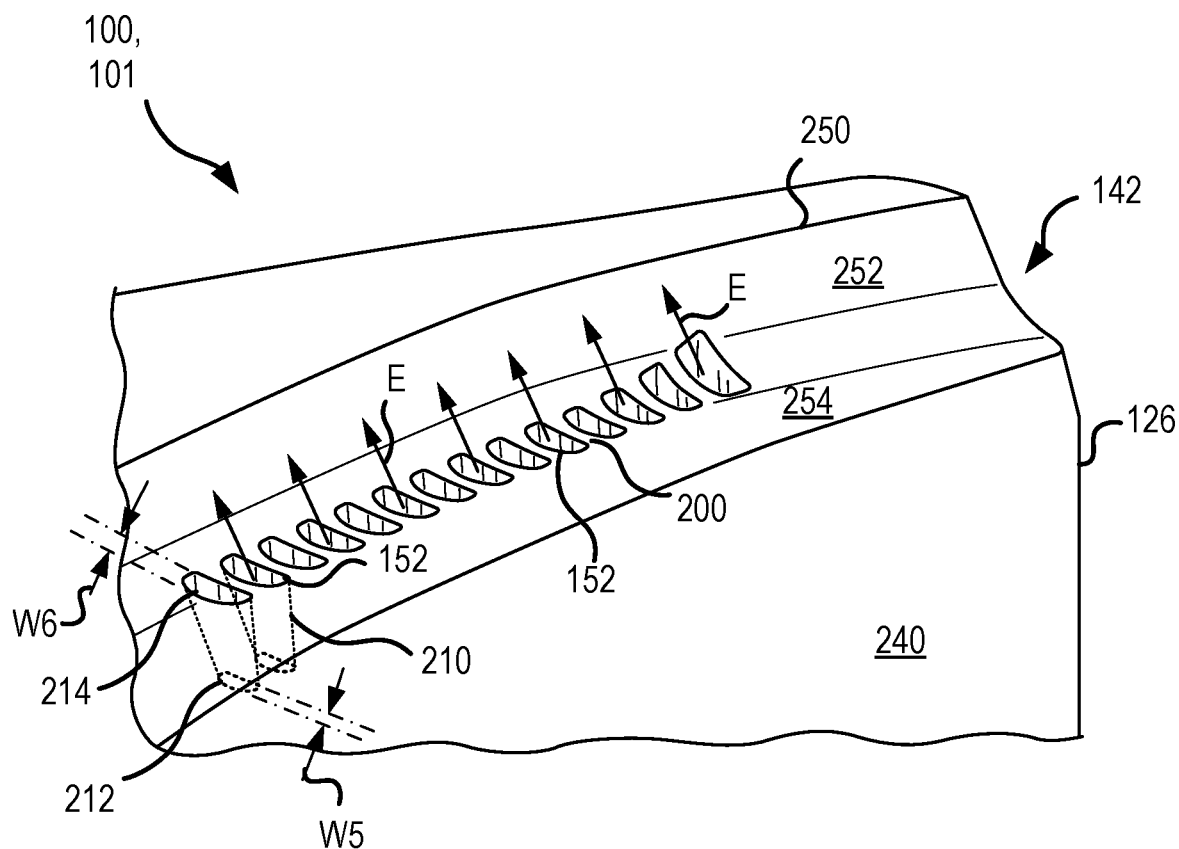

With reference to FIGS. 3A and 3B and to FIGS. 4A and 4B, an internal cooling configuration of an airfoil 100 is shown as defined on a casting core 160, in accordance with various embodiments. Casting core 160 may be a negative of the cooling features of airfoil 100. Stated differently, airfoil cooling features, such as protrusions or pedestals, may appear as indentations and/or passages formed on a casting core 160. When formed on airfoil 100, the cooling features may protrude from and/or across an internal passage. In this regard, one or more pedestals 200 (FIGS. 4A and 4B) inside the airfoil 100 may be defined by a plurality of apertures 180 in casting core 160 (FIGS. 3A and 3B). Similarly, one or more cooling passages 210 (FIGS. 4A and 4B) defined in the airfoil 100 are occupied by casting protrusions 190 of casting core 160 (FIGS. 3A and 3B). In that regard, casting core 160 may be configured as a negative of the internal passages of airfoil 100.

Referring to FIGS. 3A and 3B, a casting core 160 is shown relative to an airfoil 100 shown by dashed lines, in accordance with various embodiments. Casting core 160 may comprise a core body 162 having a tip region 164 at a radially outer edge of core body 162. Core body 162 of casting core 160 may comprise a leading edge 170 and a trailing edge 172. Tip region 164 may extend between the leading edge 170 and the trailing edge 172 at the radially outer edge of casting core 160.

Core body 162 may define one or more cooling passages 158 within airfoil 100. Casting core 160 may comprise a tip comb 166 extending from tip region 164. The tip comb 166 of casting core 160 may be integrally formed with the core body 162 of casting core 160. In this regard, casting core 160 including core body 162 and tip comb 166 may comprise a unitary structure having a uniform material. In various embodiments, casting core 160 including core body 162 and tip comb 166 may comprise a ceramic. Casting core 160 may include other materials, such as polymer, metal, metal alloys, and/or ceramic matrix composites, among others. Tip comb 166 may extend beyond a tip region 142 of airfoil 100 during the casting process to define outlets 152 (FIGS. 4A and 4B). Similarly, casting core 160 may extend beyond trailing edge 126 of airfoil 100 during the casting process to define outlets 154 at trailing edge 126 (FIG. 2).

Tip comb 166 may comprise a plurality of casting protrusions 190 defining a plurality of apertures 180 therebetween. For example, tip comb 166 may comprise a first casting protrusion 190a and a second casting protrusion 190b. The first casting protrusion 190a and second casting protrusion 190b may define aperture 180, which may have a tapered geometry. Aperture 180 may have a first width W1 at a proximal end 182 and a second width W2 at a distal end 184. The first width W1 of aperture 180 may be different than the second width W2 of aperture 180. The second width W2 of the aperture 180 may be less than the first width W2. In this regard, apertures 180 may have a tapered shape that converge toward a distal end 184, i.e., toward tip region 164.

Each of the casting protrusions 190, such as first casting protrusion 190a and second casting protrusion 190b, may have a first width W3 at a proximal end 192 and a second width W4 at a distal end 194. The first width W3 of a casting protrusion 190 may be different than the second width W4 of casting protrusion 190. The second width W4 of casting protrusion 190 may be greater than the first width W3. In this regard, casting protrusions 190 may have a tapered shape that diverge toward a distal end 194, i.e., toward tip region 164.

In various embodiments, casting core 160 may be placed in a mold, and the material to form the airfoil 100 may be deposited in the mold. Airfoil 100 may be made from a material different from the material of casting core 160, such as a metal or metal alloy. Airfoil 100 may be made from an austenitic nickel-chromium-based alloy, or other materials capable of withstanding exhaust temperatures. Casting core 160 may be removed from the airfoil 100, leaving a cavity, such as cooling passage 158, with the desired internal cooling features, such as pedestals 200 and cooling passages 210 within airfoil 100 (FIGS. 4A and 4B).

With reference to FIGS. 4A and 4B, a tip region of an airfoil 100 formed using casting core 160 is shown, in accordance with various embodiments. As discussed above, pedestals 200 inside airfoil 100 may be defined by apertures 180 in casting core 160 (FIGS. 3A and 3B). Similarly, cooling passages 210 formed through airfoil 100 may be occupied by casting protrusions 190 of casting core 160 (FIGS. 3A and 3B) during the manufacturing of airfoil 100. Airfoil body 120 of airfoil 100 may define an airflow path E formed by casting core 160.

Airfoil body 120 may include a pressure side wall 240 (i.e. having a generally concave surface) and a suction side wall 242 (i.e. having a generally convex surface) joined together at the respective trailing edge 126 and leading edge 124. In various embodiments, a tip shelf 250 may be formed in tip region 142 of airfoil body 120. In various embodiments, the tip shelf 250 follows the curvature of the airfoil and is angled to face towards the suction side of the airfoil. For example, tip shelf 250 may comprises a suction side wall portion and a radially outward wall portion. In various embodiments, the tip shelf 250 may be angled to face towards the pressure side of the airfoil and thus tip shelf 250 may comprise a pressure side wall portion 252 and a radially outward wall portion 254. Tip shelf 250 may be manufactured by subtractive techniques, drilling, milling, machining or other suitable process. In various embodiments, tip shelf 250 may be formed after removing casting core 160. In this regard, the step of forming tip shelf 250 may also form outlets 152 in the surface of tip shelf 250.

The removal of casting core 160 may leave one or more cooling passages 210 defined by one or more pedestals 200. In that regard, tip region 142 may comprise a plurality of pedestals 200 defining a plurality of cooling passages 210 therebetween. For example, tip region 142 may comprise a first pedestal 200a and a second pedestal 200b disposed in the airflow path E at the tip region 142. First pedestal 200a and second pedestal 200b may define a cooling passage 210 having a proximal end 212 and a distal end 214. The proximal end 212 of the cooling passage 210 may have a first width W5 and the distal end 214 of the cooling passage 210 may have a second width W6. The first width W5 of cooling passage 210 may be different than the second width W6. In various embodiments, the first width W5 of cooling passage 210 may be greater than the second width W6. In this regard, cooling passage 210 may have a tapered shape that diverges toward a distal end 214, i.e., toward tip region 142.

The casting protrusions 190 of casting core 160 (FIGS. 3A and 3B) define cooling passages 210 of airfoil 100 (FIGS. 4A and 4B). Thus, first width W3 of casting protrusions 190 may be the same as first width W5 of second width W6. Second width W4 of casting protrusions 190 may be the same as second width W6 of second width W6. Similarly, a width of apertures 180 of casting core 160 (FIGS. 3A and 3B) may be the same as the width of pedestals 200 of airfoil 100 (FIGS. 4A and 4B).

Cooling passage 210 may comprise an outlet 152 formed in the tip shelf 250. Cooling passage 210 may be directed radially outward and toward the pressure side wall portion 252 of tip shelf 250. The various widths of cooling passages 210 may be selected to control the flow rate and direction of airflow path E through the cooling passages 210 and the flow rate and direction of airflow path E at the outlets 152. Pressure side wall portion 252 of tip shelf 250 may receive a cooling airflow, i.e., airflow path E, from cooling passages 210. This width of outlets 152, i.e., the second width W6 of cooling passages 210, may be greater than the width of typical outlets formed by, for example, drilling. The greater width outlets 152 allows coatings to be applied to tip shelf 250, such as to pressure side wall portion 252 and/or radially outward wall portion 254 without undesirably covering or clogging the outlets 152 with a coating material.

Figure 5:
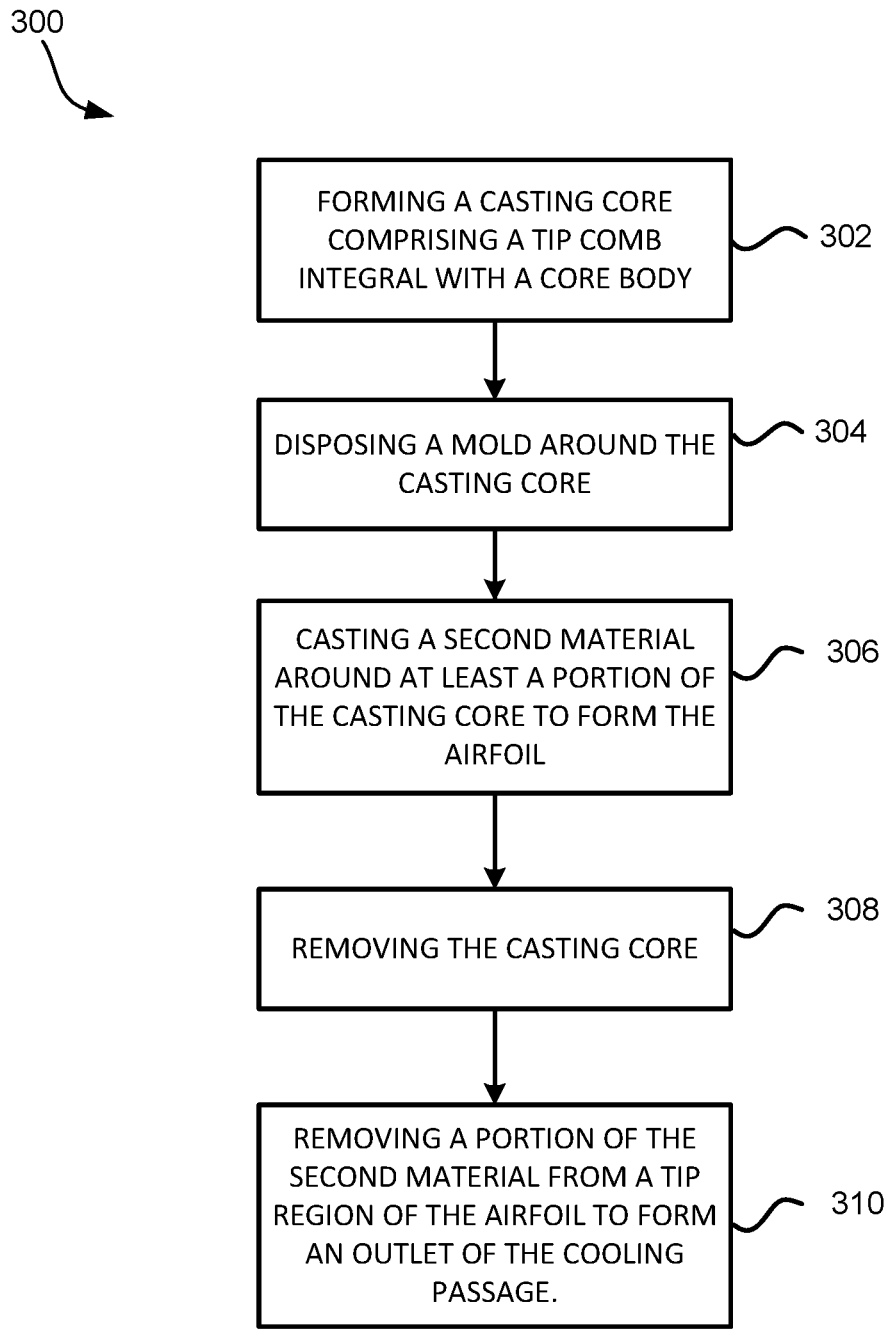
FIG. 5 illustrates a method of manufacturing an airfoil, in accordance with various embodiments.

With reference to FIG. 5, a method of manufacturing an airfoil is shown, in accordance with various embodiments. The method 300 may include the step of forming a casting core comprising a tip comb integral with a core body (step 302). The casting core may comprise a first material. The method 300 may include the steps of disposing a mold around the casting core (step 304), casting a second material around at least a portion of the casting core to form the airfoil (step 306), removing the casting core (step 308), and removing a portion of the second material from a tip region of the airfoil to form an outlet of the cooling passage (step 310).

In various embodiments, the first material, i.e., the material of the casting core 160, comprises a ceramic, and the second material, i.e., the material of the airfoil 100, comprises a metal.

Step 304 may comprise leaving a portion of the tip comb 166 extending beyond a tip region 142 of the airfoil 100. The tip comb 166 may be configured to form cooling passages 210 in the tip region 142 of the airfoil 100. Step 308 may further comprise the removing the casting core 160 to form one or more cooling passages 210 within the airfoil 100.

Step 306 may comprise casting the second material to form at least one pedestal 200. The cooling passages 210 are separated by the at least one pedestal 200. The cooling passages 210 comprise a tapered geometry which diverges toward the outlet 152 of the cooling passage 210.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An airfoil, comprising:
    an airfoil body defining an airflow path;
    a tip shelf defined in a tip region, wherein the tip region is disposed at a radially outer edge of the airfoil body, wherein the tip shelf comprises a pressure side wall portion and a radially outward wall portion; and
    a first pedestal and a second pedestal disposed in the airflow path at the tip region;
    wherein the first pedestal and the second pedestal define a cooling passage having a proximal end and a distal end;
    wherein the proximal end of the cooling passage has a first width and the distal end of the cooling passage has a second width, wherein the cooling passage comprises an outlet defined in the tip shelf;
    wherein the first width is greater than the second width.

2. The airfoil of claim 1, wherein the first pedestal and the second pedestal have a tapered geometry.

* * * * *

UNITED STATES PATENT AND TRADEMARK OFFICE
CERTIFICATE OF CORRECTION

PATENT NO. : 10,822,959 B2
APPLICATION NO. : 15/623787
DATED : November 3, 2020
INVENTOR(S) : Evan P. Molony et al.

Page 1 of 1

It is certified that error appears in the above-identified patent and that said Letters Patent is hereby corrected as shown below:

In the Claims

In Claim 1, at Column 10, Line 46, after wherein, please insert -- the distal end of the --

In Claim 1, at Column 10, Line 48, after wherein, please delete "the first width is greater than the second width" and insert -- the cooling passage comprises a tapered shape that diverges from the proximal end to the distal end; and wherein the cooling passage is angled toward the pressure side wall portion of the tip shelf such that cooling airflow from the cooling passage is directed at the pressure side wall portion. --

Signed and Sealed this
Twenty-third Day of March, 2021

Drew Hirshfeld
*Performing the Functions and Duties of the*
*Under Secretary of Commerce for Intellectual Property and*
*Director of the United States Patent and Trademark Office*